United States Patent
Lozon et al.

(10) Patent No.: US 10,902,220 B2
(45) Date of Patent: Jan. 26, 2021

(54) SYSTEMS AND METHODS OF GENERATING RESPONSES ASSOCIATED WITH NATURAL LANGUAGE INPUT

(71) Applicant: The Toronto-Dominion Bank, Toronto (CA)

(72) Inventors: Martin Albert Lozon, London (CA); Tsung-Jung Lu, Mississauga (CA); Percy Richard Golding, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 116 days.

(21) Appl. No.: 16/382,380

(22) Filed: Apr. 12, 2019

(65) Prior Publication Data
US 2020/0327200 A1    Oct. 15, 2020

(51) Int. Cl.
*G06F 40/56* (2020.01)
*G06F 16/9032* (2019.01)
*G06F 40/30* (2020.01)

(52) U.S. Cl.
CPC ........ *G06F 40/56* (2020.01); *G06F 16/90332* (2019.01); *G06F 40/30* (2020.01)

(58) Field of Classification Search
CPC ............................... G06F 40/56; H04L 67/26
USPC .......................................................... 704/9
See application file for complete search history.

(56) References Cited

U.S. PATENT DOCUMENTS

| | | |
|---|---|---|
| 6,964,023 B2 | 11/2005 | Maes et al. |
| 7,366,666 B2 | 4/2008 | Balchandran et al. |
| 7,403,890 B2 | 7/2008 | Roushar |
| 7,475,010 B2 | 1/2009 | Chao |
| 7,596,568 B1 | 9/2009 | McConnell |
| 7,676,754 B2 | 3/2010 | Basson et al. |
| 8,082,264 B2 | 12/2011 | Bierner |
| 8,165,886 B1 | 4/2012 | Gagnon et al. |
| 8,175,248 B2 | 5/2012 | Agarwal et al. |

(Continued)

OTHER PUBLICATIONS

Ulas Nambiar et al., Discovering customer intent in real-time for streamlining service desk conversations, CIKM 11 Proceedings of the 20th ACM international conference on Information and knowledge management, Oct. 24-28, 2011, https://dl.acm.org/citation.cfm?id=2063776.

(Continued)

*Primary Examiner* — Susan I McFadden
(74) *Attorney, Agent, or Firm* — Rowand LLP

(57) ABSTRACT

Systems and methods of generating responses associated with natural language input. A system includes a communication module, a processor, and a memory. The memory stores instructions that, when executed, configure the processor to: transmit, to a conversation agent server, a natural language input and receive, from the conversation agent server, an intent and at least one parameter. The processor generates, based on the intent and the at least one parameter, a fulfillment query requesting access to personal data for generating a response to the natural language input, where the personal data is stored on a fulfillment server. The processor transmits the fulfillment query and receives a response indication from the fulfillment server. The processor generates a request for subsequent input, generates an updated conversation context based on the response indication and the intent, and transmits to the conversation agent server, the updated conversation context.

20 Claims, 7 Drawing Sheets

(56) References Cited

U.S. PATENT DOCUMENTS

| | | | |
|---|---|---|---|
| 8,346,563 | B1 | 1/2013 | Hjelm et al. |
| 8,560,325 | B2 | 10/2013 | Kanevsky et al. |
| 8,670,979 | B2 | 3/2014 | Gruber et al. |
| 8,676,565 | B2 | 3/2014 | Larcheveque et al. |
| 9,292,254 | B2 | 3/2016 | Simpson et al. |
| 9,338,493 | B2 | 5/2016 | Van Os et al. |
| 9,548,066 | B2 | 1/2017 | Jain et al. |
| 9,575,963 | B2 | 2/2017 | Pasupalak et al. |
| 9,620,147 | B2 | 4/2017 | Deshmuhk et al. |
| 9,734,193 | B2 | 8/2017 | Rhoten et al. |
| 10,419,489 | B2 * | 9/2019 | Kalia .................... G06F 40/211 |
| 10,574,719 | B2 * | 2/2020 | O'Connell ............ H04L 65/607 |
| 10,592,608 | B2 * | 3/2020 | Benantar ............... G06F 16/907 |
| 10,762,113 | B2 * | 9/2020 | Jia ........................... G06N 5/02 |
| 10,769,187 | B2 * | 9/2020 | Braga .................. G06K 9/6253 |
| 2004/0024601 | A1 | 2/2004 | Gopinath et al. |
| 2004/0193420 | A1 | 9/2004 | Kennewick et al. |
| 2005/0033574 | A1 | 2/2005 | Kim et al. |
| 2005/0165607 | A1 | 7/2005 | Di Fabbrizio et al. |
| 2007/0106568 | A1 | 5/2007 | Asher et al. |
| 2008/0281598 | A1 | 11/2008 | Eide et al. |
| 2012/0035924 | A1 | 2/2012 | Jitkoff et al. |
| 2013/0275138 | A1 | 10/2013 | Gruber et al. |
| 2014/0244249 | A1 | 8/2014 | Mohamed et al. |
| 2014/0365209 | A1 | 12/2014 | Evermann |
| 2017/0193387 | A1 | 7/2017 | Lavallee |
| 2017/0213157 | A1 | 7/2017 | Bugay et al. |
| 2017/0357716 | A1 | 12/2017 | Bellegarda et al. |
| 2017/0366479 | A1 | 12/2017 | Ladha et al. |
| 2018/0032503 | A1 | 2/2018 | Swart et al. |
| 2018/0068657 | A1 | 3/2018 | Khan et al. |
| 2018/0157721 | A1 | 6/2018 | Khaitan et al. |
| 2019/0378519 | A1 * | 12/2019 | Dunjic .................... G06F 21/83 |
| 2020/0110843 | A1 * | 4/2020 | Dunjic .................. G10L 15/063 |

OTHER PUBLICATIONS

Michael McTear, Implementing Spoken Language Understanding, The Conversational Interface, May 20, 2016, pp. 187-208, https://link.springer.com/chapter/10.1007/978-3-319-32967-3_9.

Sheila B. Banks, "Perspectives on the State of Modeling and Simulating Human Intent", AAAI Technical Report FS-02-05. Compilation copyright © 2002, http://citeseerx.ist.psu.edu/viewdoc/download?doi=10.1.1.502.7015&rep=rep1&type=pdf.

R.Sarikaya; P.A.Crook; A.Marin; M.Jeong; J.P.Robichaud; A.Celikyilmaz; Y.B.Kim; A.Rochette; O.Z.Khan; X.Liu; D.Boies; T.Anastasakos; Z.Feizollahi; N.Ramesh; H.Suzuki; R.Holenstein; E.Krawczyk; V.Radostev, "An Overview of End-to-End Language Understanding and Dialog Management for Personal Digital Assistants", "2016 IEEE Spoken Language Technology Workshop (SLT)Publication Date: Dec. 13-16, 2016", https://ieeexplore.ieee.org/stamp/stamp.jsp?tp=&arnumber=7846294.

* cited by examiner

SYSTEMS AND METHODS OF GENERATING RESPONSES ASSOCIATED WITH NATURAL LANGUAGE INPUT

TECHNICAL FIELD

The present application relates to language processing systems and, in particular, to systems and methods of generating responses associated with natural language input.

BACKGROUND

Chatbots, also known as artificial conversational entities, conversational bots, interactive agents, or the like, are computer programs configured to receive input from a user and to provide one or more responses so as to mimic human conversation with the user. Chatbots may be trained for targeted use scenarios. For example, chatbots may be trained for customer service scenarios to automate relatively simple yet relatively time-consuming tasks, such as providing information based on customer queries (e.g., providing information on products), conducting routine tasks (e.g., ordering goods), or the like. Chatbots may be developed and deployed on cloud-based computing platforms that include natural language processing and artificial intelligence functions and can conduct conversations with a user via auditory or textual methods.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
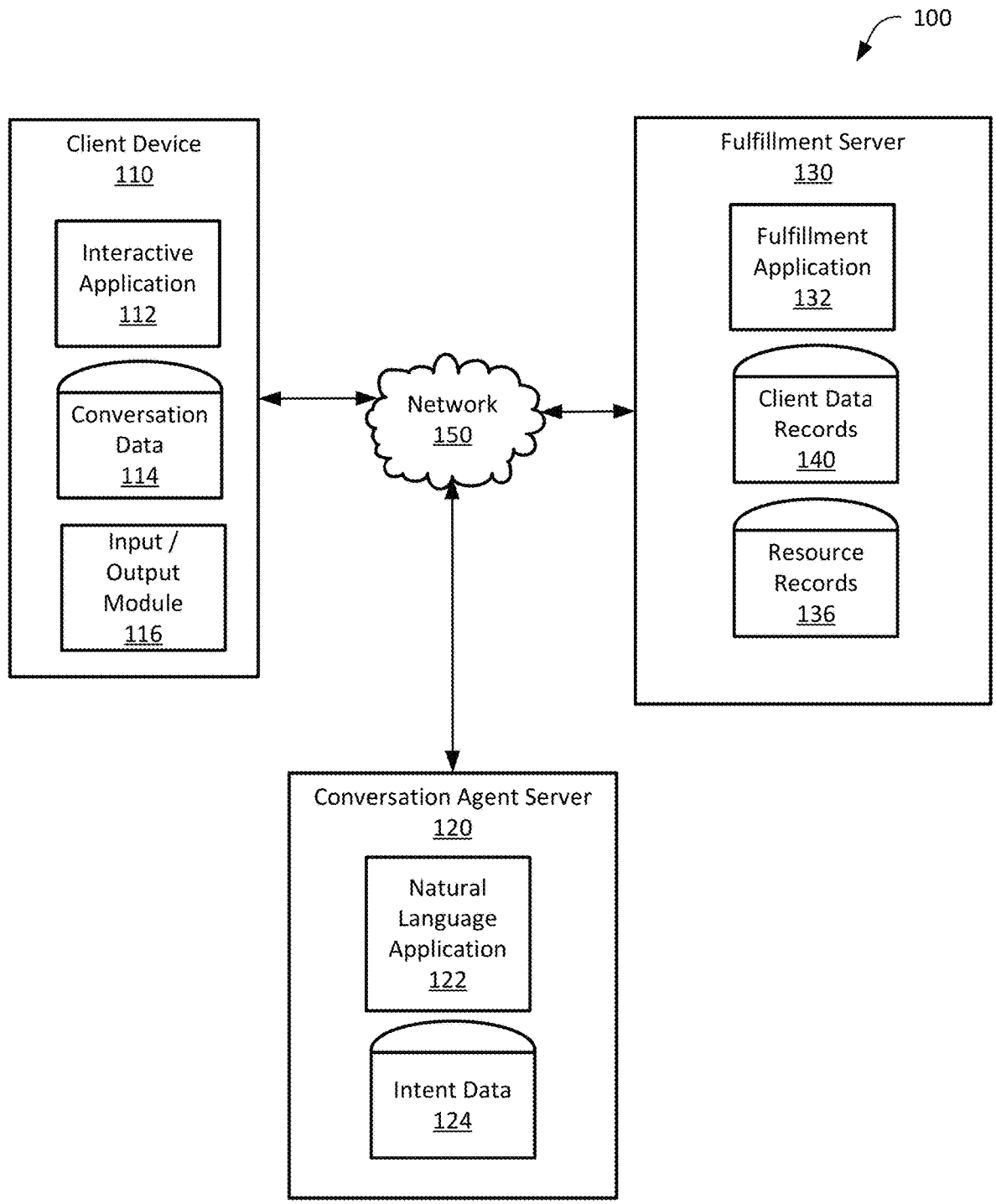
FIG. 1 illustrates, in block diagram form, a system of generating responses associated with natural language input, in accordance with an example of the present application.

In one aspect, the present application describes a computing device including: a communication module; a processor coupled to the communication module; and a memory coupled to the processor. The memory may store instructions that, when executed, configure the processor to: transmit, to a conversation agent server, a natural language input; receive, from the conversation agent server, an intent and at least one parameter, wherein the intent and the at least one parameter are based on the natural language input, and wherein identification by the conversation agent server of the intent from the natural language input is syntax agnostic; generate, based on the intent and the at least one parameter, a fulfillment query requesting access to personal data for generating a response to the natural language input, wherein the personal data is stored on a fulfillment server; transmit, to the fulfillment server, the fulfillment query; receive, from the fulfillment server, a response indication associated with the fulfillment query; generate a request for subsequent input based on the response indication; generate an updated conversation context based on the response indication and the intent; and transmit, to the conversation agent server, the updated conversation context for setting up operations to handle the subsequent input.

In some implementations, the natural language input may be associated with a user identifier, and the natural language input may include a query on personal data of a data record corresponding to the user identifier.

In some implementations, the response indication may include the personal data associated with the user identifier.

In some implementations, the generated fulfillment query may corroborate the at least one parameter.

In some implementations, the instructions, when executed, may further cause the processor to determine that the received at least one parameter includes information to conduct an action associated with the intent; and transmit, to the fulfillment server, an action request associated with the natural language input.

In some implementations, the generated request for subsequent input may include a message prompt for display by the computing device.

In some implementations, the natural language input may include an acoustic input, and the instructions, when executed, may further cause the processor to conduct speech-to-text operations to provide a text-based natural language input.

In some implementations, the natural language input may include text-based input received via an input module of the computing device.

In some implementations, the instructions, when executed, may further configure the processor to: receive the subsequent input; and subsequent to transmitting, to the conversation agent server, the updated conversation context for setting up operations to handle the subsequent input, transmit the subsequent input to the conversation agent server.

In some implementations, the subsequent input may include natural language input.

In another aspect, the present application describes a computer-implemented method of generating a response associated with a natural language input. The method may include: transmitting, to a conversation agent server, the natural language input; receiving, from the conversation agent server, an intent and at least one parameter, wherein the intent and the at least one parameter are based on the natural language input, and wherein identification by the conversation agent server of the intent from the natural language input is syntax agnostic; generating, based on the intent and the at least one parameter, a fulfillment query requesting access to personal data for generating a response to the natural language input, wherein the personal data is stored on a fulfillment server; transmitting, to the fulfillment server, the fulfillment query; receiving, from the fulfillment server, a response indication associated with the fulfillment query; generating a request for subsequent input based on the response indication; generating an updated conversation context based on the response indication and the intent; and transmitting, to the conversation agent server, the updated conversation context for setting up operations to handle the subsequent input.

In some implementations, the natural language input may be associated with a user identifier, and the natural language input may include a query on personal data of a data record corresponding to the user identifier.

In some implementations, the response indication may include the personal data associated with the user identifier.

In some implementation, the generated fulfillment query may corroborate the at least one parameter.

In some implementations, the method may include: determining that the received at least one parameter includes information to conduct an action associated with the intent; and transmitting, to the fulfillment server, an action request associated with the natural language input.

In some implementations, the generated request for subsequent input may include a message prompt for display by a computing device.

In some implementations, the natural language input may include an acoustic input, and the method may include conducting speech-to-text operations to provide a text-based natural language input.

In some implementations, the natural language input may include text-based input received via an input module of a computing device.

In some implementations, the method may include: receiving the subsequent input; and subsequent to transmitting, to the conversation agent server, the updated conversation context for setting up operations to handle the subsequent input, transmitting the subsequent input to the conversation agent server.

In another aspect, a non-transitory computer-readable storage medium storing processor executable instructions that, when executed, cause a processor to carry out the operations of one or more methods described herein. For example, the non-transitory computer-readable storage medium storing may include instructions of generating a response associated with a natural language input. For example, the processor executable instructions may configure the processor to: transmit, to a conversation agent server, the natural language input; receive, from the conversation agent server, an intent and at least one parameter, wherein the intent and the at least one parameter are based on the natural language input, and wherein identification by the conversation agent server of the intent from the natural language input is syntax agnostic; generate, based on the intent and the at least one parameter, a fulfillment query requesting access to personal data for generating a response to the natural language input, wherein the personal data is stored on a fulfillment server; transmit, to the fulfillment server, the fulfillment query; receive, from the fulfillment server, a response indication associated with the fulfillment query; generate a request for subsequent input based on the response indication; generate an updated conversation context based on the response indication and the intent; and transmit, to the conversation agent server, the updated conversation context for setting up operations to handle the subsequent input.

In another aspect, the present application describes a computing server for identifying an intended record among a plurality of defined records, wherein each of the defined records may be associated with a respective moniker. The computing server may include: a communication module; a processor coupled to the communication module; and a memory coupled to the processor. The memory stores instructions that, when executed, may configure the processor to: receive, from a client device, a fulfillment query associated with a user identifier, the fulfillment query including a partial moniker associated with the intended record; obtain defined records associated with the user identifier; determine that the partial moniker is associated with at least two defined records associated with the user identifier; generate and transmit, to the client device, a clarifying query to identify the intended record; receive, from the client device, subsequent input associated with the clarifying query; determine that the identified record is identifiable based on the subsequent input and the partial moniker; and conduct a transaction based on the identified record.

In some implementations, the fulfillment query may be based on natural language input.

In some implementations, the respective monikers may include at least two words.

In some implementations, the partial moniker may include at least one word, and the respective monikers may include a greater number of words than a number of words of the partial moniker.

In some examples, the defined records may be at least one of a bank account record, a credit card account record, an investment account record, or a credit loan account record.

In another aspect, the present application describes a computer-implemented method of identifying an intended record among a plurality of defined records, wherein each of the defined records are associated with a respective moniker. The method may include: receiving, from a client device, a fulfillment query associated with a user identifier, the fulfillment query including a partial moniker associated with the intended record; obtaining defined records associated with the user identifier; determining that the partial moniker is associated with at least two defined records associated with the user identifier; generating and transmitting, to the client device, a clarifying query to identify the intended record; receiving, from the client device, subsequent input associated with the clarifying query; determining that the identified record is identifiable based on the subsequent input and the partial moniker; and conducting a transaction based on the identified record.

In some implementations, the fulfillment query may be based on natural language input.

In some implementations, the respective monikers may include at least two words.

In some implementations, the partial moniker may include at least one word, and the respective monikers may include a greater number of words than a number of words of the partial moniker.

In some examples, the defined records may be at least one of a bank account record, a credit card account record, an investment account record, or a credit loan account record.

In another aspect, a non-transitory computer-readable storage medium storing processor executable instructions that, when executed, cause a processor to carry out the operations of one or more methods described herein. For example, the non-transitory computer-readable storage medium may include instructions of identifying an intended record among a plurality of defined records, wherein each of the defined record is associated with a respective moniker. For example, the processor executable instructions may configure the processor to: receive, from a client device, a fulfillment query associated with a user identifier, the fulfillment query including a partial moniker associated with the intended record; obtain defined records associated with the user identifier; determine that the partial moniker is associated with at least two defined records associated with the user identifier; generate and transmit, to the client device, a clarifying query to identify the intended record; receive, from the client device, subsequent input associated with the clarifying query; determine that the identified record is identifiable based on the subsequent input and the partial moniker; and conduct a transaction based on the identified record.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

It may be appreciated that while examples described herein include data or fulfillment servers associated with banking institutions, the systems and methods described herein may also be applicable to data or fulfillment servers associated with non-banking institutions which store and process other types of personal data. For example, non-banking data servers may include government operated computer servers for administering taxation programs, retail company servers for administering customer loyalty/incentive programs, or the like, where misappropriation of data at the data servers may be perilous to a user's identity or considered a breach of a user's privacy.

Cloud-based natural language processing software packages may be used to develop chatbots. In some examples, a chatbot may be configured to receive input and to provide one or more responses so as to mimic human conversation with a user. The received input and the provided response may be text-based or may be voice-based. Google Dialogflow™ is one example of a cloud-based natural language processing software package. Other examples of natural language processing software packages may include spaCy™, Apache OpenNLP™, Standford NLP™, or the like. It may be appreciated that other examples of cloud-based natural language processing software packages may be contemplated. In some examples, natural language processing software packages may be one or a combination of a rules-based chatbot or a machine learning based chatbot.

In some examples, a computing server (e.g., conversation agent server) may include memory storing a natural language processing software package having instructions that, when executed, configure a processor of the computing server to conduct operations for maintaining conversation context of user interactions. For example, if a user provides an ambiguous input, the processor may detect the ambiguous input and place natural language processing software package in a state (e.g., conversation context) associated with prompting the user for clarification and for receiving/handling subsequent user input to address the detected ambiguity.

In some examples, the conversation agent server may be configured to transmit queries to other computing servers (e.g., fulfillment servers or data servers) via application programming interfaces (APIs). The conversation agent server may request access to data from data servers or request responses to queries where access to data stored on a fulfillment server may be required. Subsequently, data or responses may be provided via the conversation agent server to the client device.

A conversation agent server may be trained for a particular target use. For example, an institution may provide large volumes of potential natural language input and associate such natural language input with at least one intent. In some examples, an intent may be associated with a group of input (e.g., natural language input) having similar meaning. The respective inputs of the group may use different words or sentence structure but may have substantially the same meaning and be associated with a common intent.

Further, the institution that is training the conversation agent server may associate such natural language input with a response or initiate operations associated with such input. For example, a banking institution may train a conversation agent server to provide a banking account chatbot for banking clients. The banking chatbot may be trained to provide responses or initiate banking operations in response to natural language input, such as "What is the balance of my chequing bank account as of June 30?" or "Please transfer two thousand dollars from my savings bank account to my registered investment account." Users providing natural language input may utilize colloquial or free-form language. Thus, in some scenarios, the provided user input may be ambiguous or erroneous. Continuing with the above example, a user may have two or more active registered investment accounts at the banking institution and, thus, the user input may be ambiguous. Because the conversation agent server may not be able to disambiguate the user input based solely on the provided natural language input, systems and methods of prompting additional clarifying user input may be desirable.

In some examples, the conversation agent server executing the above-described natural language processing software package may be a third party server. The third party server may be operated by an entity that is apart from the banking institution. Upon receiving a user input, the conversation agent server may determine a user intent, parameterize the user input, or may interact with the banking institution to request access to personal data associated with a user. In some examples, personal data can include names, addresses, social security numbers (e.g., taxpayer identification numbers), bank account balances, or the like. The personal data may include data that, if misappropriated by an unscrupulous entity, may be used for conducting fraudulent activity that may be injurious to bank account users.

As third party servers may be operated by vendor entities that are separate from banking institutions and that may not be bound by confidentiality or privacy laws, regulations, or rules that the banking institutions may be bound to, it may be desirable to provide systems, devices, and methods to receive user input and to provide responses based on personal data access that ameliorate confidentiality or privacy concerns associated with conversation agent server systems.

Reference is made to FIG. 1, which illustrates, in block diagram form, a system 100 of generating responses associated with natural language input, in accordance with an example of the present application. Example personal data may include data associated with banking accounts or resource records. However, it may be understood that personal data may include other types of data in non-banking contexts, the misappropriation of which by an unscrupulous entity may be injurious to a user associated with that personal data.

The system 100 includes a client device 110, a conversation agent server 120, and a fulfillment server 130. The system 100 may also include a network 150. The client device 110, the conversation agent server 120, and the fulfillment server 130 may be configured to communicate over the network with one another or with any other similar computing device. The network 150 may include one or a combination of interconnected wired or wireless networks, including the Internet, local area networks, wireless area networks, or the like.

The client device 110 may be associated with a banking user. The client device 110 may be configured to receive input and may be configured to interact with the banking user. For example, the client device 110 may include an interactive application 112 having processor executable instructions stored in memory that, when executed, cause a processor to conduct operations described herein for receiving user input or interacting with a banking user. In illustrative examples described herein, the interactive application 112 may be a mobile banking application associated with the fulfillment server 130 (e.g., banking institution server). The interactive application 112 may receive input from a banking user and may conduct actions or generate responses in response to banking user input. It may be appreciated that other types of applications may be contemplated. The client device 110 may also include conversation data 114 stored in memory. Conversation data 114 may include data associated with natural language input received from a user of the client device 110. The conversation data 114 can include user intents or parameters that are based on natural language input.

The banking user may interact with the client device 110 via an input/output module 116. For example, the input/output module 116 may include a touch screen display for displaying a user interface and a touch screen interface for receiving motion or touch input from the banking user. The input/output module 116 may include an acoustic input transducer (e.g., microphone) and a loudspeaker. The acoustic input transducer may receive acoustic input from the banking user and the loudspeaker may generate and provide an acoustic output to the banking user. Other examples of input/output modules for receiving user input and providing responses may be contemplated.

In some examples, the input/output module 116 may receive natural language input. Natural language input may describe language used among two or more people during a conversation, in contrast to structured communication protocol for transmission and receipt of data among computing devices. For example, existing computing device interfaces may require structured and predictable data input for conducting operations. Such structured and predictable data input schemes may make use of unnatural interfaces and may be challenging to use. For instance, when a user fails to exactly follow the structured data input schemes, the input may not be recognized by a computer. On the other hand, natural language input may be syntax agnostic. For instance, a banking user may provide input such as "What is company A's stock worth today?" Another banking user may provide varied input for seeking a response to a substantially similar question: "What's the price of the company stock today?" Accordingly, it may be desirable to provide systems and methods for processing natural language user input. That is, it may be desirable to provide systems and methods for managing nuances of language.

The conversation agent server 120 may be a single server, multiple servers, a server farm, or any other such arrangement of computing devices to implement computing server-like functionality. The conversation agent server includes one or more processors, memory, and a communication module for providing communications capabilities with other computing devices. As an illustrating example, the conversation agent server 120 may be a cloud-based natural language software processing server, such as a Google Dialogflow™ based computing device for receiving input and providing responses based on the received input. Other example cloud-based natural language processing software packages may be contemplated.

The conversation agent server 120 may include a natural language application 122 for processing natural language input and intent data 124. The natural language application 122 may be a natural language processing software application used for developing chatbots. A chatbot may be a computer program or an artificial intelligence application for conducting a conversation via auditory or textual methods. The chat bot may be designed to simulate or mimic human conversation with a user.

In some examples, natural language processing software applications may include operations for receiving natural language input, parsing the natural language input, and generating a response to the user associated with the natural language input. To train natural language processing software applications for interacting with user input, in some examples, the natural language application 122 may include operations for creating one or more user intents that map to responses. For instance, a defined user intent may be associated with or mapped to one or more examples of user utterances or user inputs. The created intents and associated training responses may be stored as intent data 124. It may be appreciated that the intent data 124 may include other data associated with operations of the natural language application 122.

As an illustrating example, the natural language application 122 may be trained to associate an "account balance" intent with an operation to check a value of a banking account. Further, training phrases that may be associated with the "account balance" intent may include "balance", "value", "account total", or the like. Accordingly, when a banking user provides a natural language input such as "What is the balance of my chequing account today?" the natural language application 122 may include operations for identifying the "account balance" intent.

Further, the natural language application 122 may include operations for identifying one or more parameters associated with the user input. Continuing with the present example, the natural language application 122 may include operations for identifying "chequing account" and "today" as parameters. Further, the natural language application 122 may also include operations for interacting with a fulfillment server 130 to retrieve or request information for generating a response to the natural language input. In the present example, the natural language application 122 may include an application programming interface (APIs) or a fulfillment interface for interacting with the fulfillment server 130. That is, the natural language application 122 may include operations for generating and transmitting a fulfillment query to the fulfillment server 130 for querying data. For example, the natural language application 122 may receive personal data (e.g., bank account value associated with a user) and generate a response, such as "Your chequing bank account balance today is $3,808". Thus, the natural language application 122 may transmit the response (e.g., "Your chequing . . . today is $3,808") to the client device 110 for output via the input/output module 116.

The fulfillment server 130 may be a single server, multiple servers, a server farm, or any other such arrangement of computing devices to implement computing server-like functionality. Fulfillment server 130 includes one or more processors, memory, and a communication module for providing communications capability with other computing devices. As an illustrating example, the fulfillment server 130 may be associated with a banking institution at which banking account users have a banking or investment account. In other examples, the fulfillment server 130 may be associated with non-banking institutions and may store personal data of other types.

The fulfillment server 130 includes a fulfillment application 132 for interacting with the client device 110 and/or the conversation agent server 120 to receive queries associated with identified banking account users and to generate responses to the received queries. For example, when a banking user associated with the client device 110 submits an electronic payment request, the fulfillment server 130 may identify a banking account associated with the banking user and conduct a payment action associated with the electronic payment request. In another example, when the conversation agent server 120 submits a fulfillment query to the fulfillment server 130, the fulfillment server 130 may identify a client data record associated with a banking user and provide data associated with the fulfillment query to the client device 110 or to the conversation agent server 120.

The fulfillment server 130 may include client data records 140. The client data records 140 may include a data record associated with a banking user, where the data record may include data associated with savings bank accounts, chequing bank accounts, investment accounts, lending products (e.g., line-of-credit account, mortgage, etc.), or the like. Further, the respective data records may include personal data associated with respective banking users. Personal data may include legal names, addresses, social security numbers (e.g., taxpayer identification number), employment history data, birth dates, or the like. It may be appreciated that personal data may include other types of data which may be considered confidential and which if misappropriated by an unscrupulous entity may be injurious to respective banking users.

The fulfillment server 130 may include resource records 136. The resource records 136 may track resources, including currency, monetary value, digital assets, tokens, precious metals, among other examples. In some examples, a client data record may be associated with a resource record and can be a data structure for tracking a running balance of money or investment instruments being managed by the banking institution. The client data record can include information associating resources with a bank account of a banking user.

In the present example, the conversation agent server 120 may include the natural language application 122 having instructions that, when executed, include operations for: (i) receiving natural language input from the client device 110; (ii) generating and transmitting a fulfillment query to the fulfillment server 130 to query personal data for generating a response to the natural language input; (iii) receiving a response indication or the queried personal data from the fulfillment server 130; and (iv) generating and transmitting a response based on the queried personal data to the client device 110.

Because the personal data may include data that is considered confidential and because the conversation agent server 120 may be operated by a third party entity that is separate from the fulfillment server 130, it may be desirable to provide systems and methods to minimize risk of personal data breaches associated with transmitting personal data via the conversation agent server 120 to the client device 110 or processing personal data at the conversation agent server 120. Although it may be desirable to rely on third party natural language processing servers for parsing natural language input, the system 100 described herein provides systems and methods to process natural language inputs associated with personal data at a cloud-based natural language processing server (e.g., conversation agent server 120) while continuing to relying on the client device 110 and/or the fulfillment server 130 to fulfil requests for personal data and to generate responses requiring access to personal data.

Figure 2:
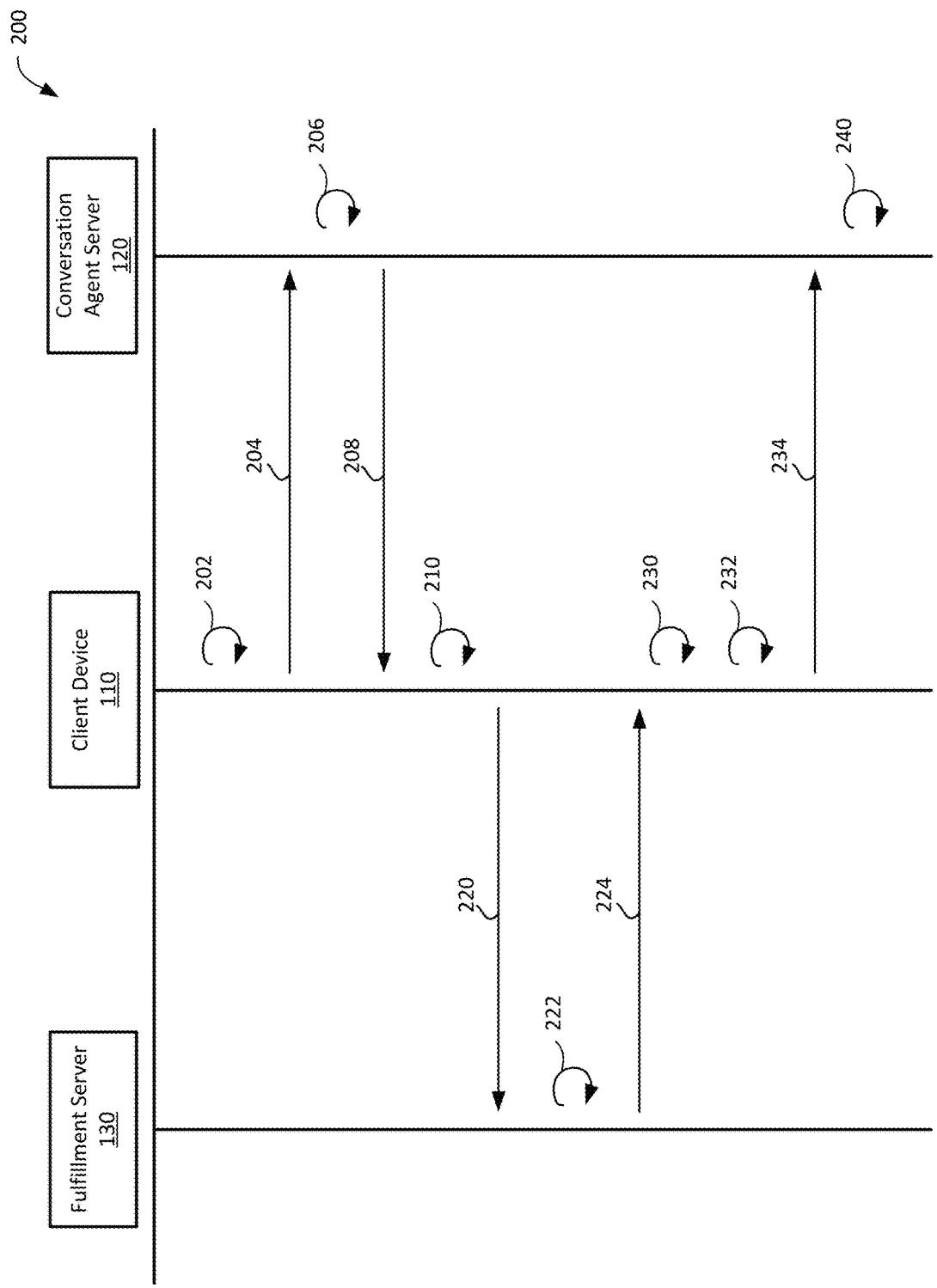
FIG. 2 illustrates a signal diagram illustrating exchanges among computing devices for generating responses associated with natural language input, in accordance with an example of the present application.

Reference is made to FIG. 2, which illustrates a signal diagram 200 illustrating exchanges among computing devices for generating responses associated with natural language input, in accordance with an example of the present application. The signal diagram 200 includes the example client device 110, the conversation agent server 120, and the fulfillment server 130 of FIG. 1.

The signal diagram 200 illustrates operations that may be implemented, at least in part, through processor executable instructions stored at one or more of the computing devices. The operations may be carried out by one or more processors of the respective devices, servers, or applications thereon. Further, the signal diagram 200 illustrates operations or exchanges associated with particular computing servers or devices. It may be understood that although a particular operation may be illustrated as being conducted at one particular device, it may be contemplated that the particular operation may be conducted alternatively at another device. For example, in a scenario where user input received at the client device 110 may be acoustic input, operations for converting speech-to-text to provide a textual natural language input may be conducted at the client device 110 or the conversation agent server 120.

To illustrate example operations of the present application, the client device 110 may be associated with a bank user and the interactive application 112 (FIG. 1) may be a mobile banking application associated with the fulfillment server 130 (e.g., banking institution server). The interactive application 112 may include an input interface for receiving user input such that the bank user may request banking information associated with a bank account or conduct banking transactions based on the user input.

At operation 202, the client device 110 receives natural language input from the bank user. The natural language input may be colloquial language input and may be provided as spoken acoustic input or as textual input. In some examples, natural language input may be syntax agnostic such that there may be two or more variant ways of expressing a particular user intent. In some examples, the client device 110 may receive spoken acoustic input via a microphone and conduct speech-to-text operations to generate textual input. In some examples, the client device 110 may receive textual input via a physical keyboard device or a virtual keyboard device displayed on a touchscreen display.

In some scenarios, the client device 110 may authenticate the bank user, such as by requesting login credentials or a password. Once the bank user is authorized, the client device 110 may associate the natural language input with a user identifier. For example, the user identifier may be a client's name or a banking account number associated with the bank user.

In some examples, the client device 110 may receive natural language input and may need to determine whether further information may be required, whether disambiguation of the natural language input may be required, or whether content of the natural language input may be erroneous.

In a first example, the client device 110 may receive the natural language input: "What is the balance of my account?" In the present example, the client device 110 may require further information. For instance, the methods described herein may be directed to determining a particular point in time, such as whether the account balance is being sought as of the end of the prior month or whether the account balance is being sought at a current time.

In a second example, the client device 110 may receive the natural language input "How much remaining credit do I currently have on my TD Travel Card?" In the present example, the bank user may have two or more credit cards that are designated as "Travel" cards and, thus, the client device 110 may require further information to reduce ambiguity to determine which "Travel Card" the bank user is referring to.

In a third example, the client device 110 may receive the natural language input "Please transfer $2,000 from my chequing account to my investment account". In the present example, the bank user may not be associated with a registered investment account and, thus, the client device 110 may need to determine whether the natural language input associated with the bank user is erroneous. Aspects of the present application may be illustrated based on the above-mentioned example natural language inputs or other example natural language input described herein.

At operation 204, the client device 110 transmits the received natural language input to the conversation agent server 120. In the scenario that the received natural language input is in textual format, the textual format may be transmitted to the conversation agent server 120. In the scenario that the received natural language input is an acoustic input (e.g., spoken input received from the bank user), the client device 110 may conduct operations to convert the acoustic input into textual format and, subsequently, transmit the textual format to the conversation agent server 120. In some examples, the client device 110 may transmit the acoustic input to the conversation agent server 120 and, upon receipt, the conversation agent server 120 may conduct operations to convert the acoustic input into textual format.

At operation 206, the conversation agent server 120 receives the natural language input and conducts intent recognition and parameterization based on the natural language input. In the first example of "What is the balance of my account", the conversation agent server 120 may identify that the natural language input is associated with an "account balance" intent. Further, the conversation agent server 120 may identify an "account" as a parameter. As will be further described for the present example, the methods herein may determine that further parameters may need to be requested before a response to the first natural language input can be generated.

In the second example of "How much remaining credit do I currently have on my TD Travel Card?", the conversation agent server 120 may identify that the input is associated with a "credit balance" intent. Further, the conversation agent server 120 may identify "TD Travel Card" as a parameter. In addition, the conversation agent server 120 may identify "today" as a parameter based on the term "currently" from the input.

In the third example of "Please transfer $2,000 . . . to my investment account", the conversation agent server 120 may identify that the input is associated with a "transfer" intent and may identify "$2,000" (e.g., amount), "chequing account" (e.g., source account), and "investment account" (e.g., target account) as parameters. In some examples, operations associated with identifying an intent and at least one parameter from the natural language input may be syntax agnostic. That is, user input may be expressed in other ways and may correspond to substantially similar example intents or parameters.

In some implementations, the conversation agent server 120 may generate a fulfillment query requesting access to personal data at the fulfillment server 130. However, as described, it may be desirable to minimize providing personal data to the conversation agent server 120 that may be operated by a third party entity to prevent misappropriation of personal data by an unscrupulous entity having access to the conversation agent server 120. Thus, it may be desirable to prevent exposure of personal data by conducting operations associated with personal data at the client device 110 or the fulfillment server 130.

At operation 208, the conversation agent server 120 transmits to the client device 110 an intent and at least one parameter, where the intent and the at least one parameter may be based on the natural language input.

At operation 210, the client device 110 may generate, based on the received intent and the at least one parameter, a fulfillment query requesting access to personal data for generating a response to the natural language input. In some examples, the personal data may be associated with client data records 140 (FIG. 1) or resource records 136 (FIG. 1) stored at the fulfillment server 130. Further, the personal data being sought may be associated with a user identifier of the bank user from whom the natural language input was received.

Continuing with the first example of "What is the balance of my account?", the client device 110 may generate a slot filling fulfillment query to identify, for instance, the subject account (e.g., savings account? Chequing account?) or the reference date on which the query is based (e.g., account balance as of today? As of the last billing cycle?). To do so, the client device 110 may require access to the client data records 140 prior to generating a request for subsequent user input. For example, if the bank user is associated with only one account, it may not be necessary to generate a request for subsequent user input to request for clarification on "account type". Accordingly, the client device 110 may generate a fulfillment query to determine whether the bank user is associated with more than one account. It may be appreciated that, in some scenarios, information regarding existence of and a number of accounts or a type of account associated with a user may be considered personal data.

In the second example of "How much remaining credit do I currently have on my TD Travel Card?", the client device 110 may generate a fulfillment query to determine whether the bank user is associated with two or more "Travel" cards. Further, the client device 110 may generate the fulfillment query to determine what the current remaining credit limit of the bank user for the "Travel" card.

In the third example of "Please transfer $2,000 . . . to my investment account", the client device 110 may generate a fulfillment query to determine whether the bank user is associated with an investment account and/or whether the chequing account associated with the bank user has an account balance of at least $2,000.

In the above-described examples, the generated fulfillment query may be for corroborating the at least one parameter. For example, the fulfillment query may be for confirming that the bank user is associated with an "investment account" (e.g., parameter identified in the third example above).

At operation 220, the client device 110 transmits, to the fulfillment server 130, the generated fulfillment query.

At operation 222, the fulfillment server 130 may generate a response indication based on the fulfillment query. For example, the fulfillment server 130 may corroborate the at least one parameter associated with the fulfillment query. In the first example of "What is the balance of my account?", the fulfillment server 130 may determine that the bank user is associated with a single account and may generate a summary of bank account balance data associated with the bank user.

In the second example of "How much remaining credit . . . on my TD Travel Card?", the fulfillment server 130 may determine that the bank user is associated with a "First Travel" card and a "Second Travel" card, thereby requiring further input to disambiguate the prior received natural language input. In the present example, the fulfillment server 130 may generate a response indication requesting that subsequent input for disambiguating the natural language input is required. Other response indications may be generated based on the originally received natural language input and the received fulfillment query.

At operation 224, the fulfillment server 130 transmits, to the client device 110, the response indication associated with the fulfillment query. The response indication may include personal data for addressing the fulfillment query (e.g., summary of bank account balance data) or one or more requests for subsequent input for addressing an ambiguous natural language input or for addressing an erroneous natural language input.

At operation 230, the client device 110 may generate a request for subsequent input based on the response indication. In the first illustrating example of "What is the balance of my account", the client device 110 may generate a request for clarification on whether the bank user may be requesting an account balance for a savings bank account or for a chequing bank account and whether the bank user may be requesting an account balance as of the end of the prior month or as of the last business day.

In the second illustrating example, the client device 110 may generate a request for clarification on which of two "Travel" cards the bank user may be referring to. That is, the client device 110 may generate a request for subsequent input to disambiguate the prior received natural language input associated with the bank user.

In the third illustrating example of "Please transfer $2,000 . . . to my investment account", the client device 110 may generate a request for subsequent input to remedy an apparent erroneous natural language input query. That is, the client device 110 may generate a request for subsequent input to clarify whether the bank user had provided an unintended target account for monetary value transfer.

At operation 232, the client device 110 may generate an updated conversation context based on the response indication and the intent. In the example operations described in the signal diagram 200 of FIG. 2, the conversation agent server 120 may be relied upon solely for intent recognition and parameterization of the received natural language input. Because the client device 110 conducts operations for identifying slot filling opportunities, for disambiguation, or for identifying erroneous natural language input, the conversation agent server 120 may not be provided with personal data to identify what subsequent input shall be requested from the bank user to fulfill the query or action request of the natural language input. That is, the conversation agent server 120 may not be able to maintain a conversation context to identify the nature of subsequent input to be received from the bank user.

In some examples, the conversation context may be helpful for determining a user intent in scenarios where similar natural language input phrases may conceivably be matched to multiple intents. For instance, in the second example of "How much remaining credit . . . on my TD Travel Card?", without conversation context, the phrase " . . . remaining credit . . . " may conceivably be matched to either a "travel award credit" intent or "spending limit credit" intent. Further, the conversation context may be useful in scenarios where an order of intent matching may be important.

Accordingly, at operation 232, the client device 110 may generate an updated conversation context based on the response indication and the intent to be transmitted to the conversation agent server 120, such that the conversation agent server 120 may be placed in a conversation state ready to receive the subsequent user input. In the second example of "How much remaining credit . . . on my TD Travel Card" where the client device 110 may have identified ambiguity, by transmitting the updated conversation context to the conversation agent server 120, the conversation agent server 120 may be placed in a state corresponding to a conversation context that the conversation agent server 120 would have been in if the conversation agent server 120 had detected the ambiguous condition itself and if the conversation agent server 120 would have prompted the user for clarification.

At operation 234, the client device 110 may transmit the updated conversation context to the conversation agent server 120 and the conversation agent server 120, at operation 240, may update the conversation context associated with the user intent of the prior received natural language input for setting up operations to handle the requested subsequent input.

In some examples described herein, the conversation agent server 120 may not be relied upon for generating and transmitting queries to data or fulfillment servers for addressing received natural language input. Rather, the conversation agent server 120 may be relied upon solely for intent recognition and parameterization of received natural language input. In some examples, by confining to the client device 110 or the fulfillment server 130 operations that relate to queries or requests associated personal data on the client device 110, the deficiencies described herein relating to conducting operations on the conversation agent server 120 may be minimized.

In some examples, a bank user may provide an acoustic input referring to one or more accounts associated with the bank user. To illustrate, reference is made to FIG. 3, which diagrammatically illustrates variant monikers for referring to several bank account cards, in accordance with an example of the present application.

Figure 3:
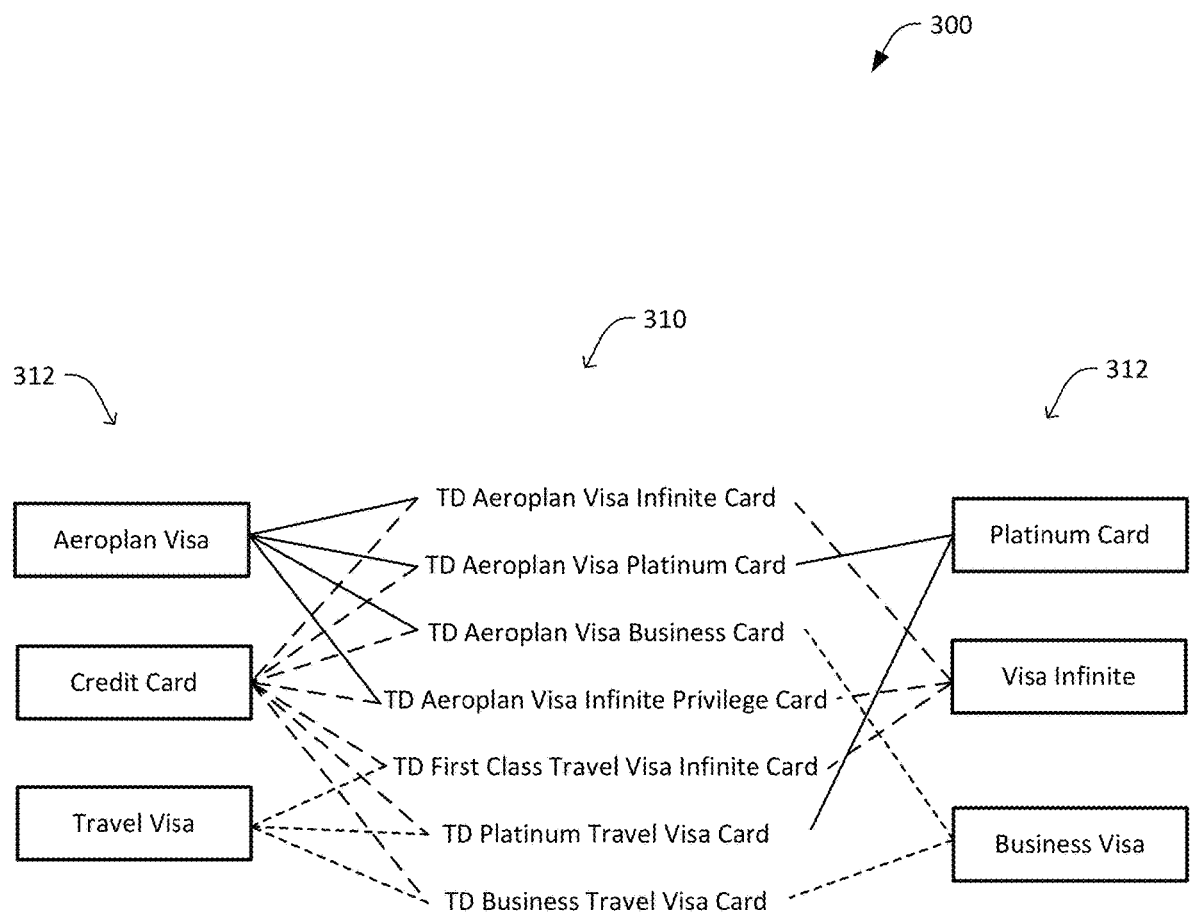
FIG. 3 diagrammatically illustrates variant monikers for referring to several account cards, in accordance with an example of the present application.

A banking institution (e.g., TD) may offer several credit card types 310, as illustrated in FIG. 3. For instance, the banking institution may offer: TD Aeroplan Visa Infinite™ Card, TD Aeroplan Visa Platinum™ Card, TD Aeroplan Visa Business™ Card, TD Aeroplan Visa Infinite Privilege™ Card, TD First Class Travel Visa Infinite™ card, TD Platinum Travel Visa™ Card, or TD Business Travel Visa™ Card, among other types of credit cards.

To illustrate, a bank user may refer to the respective credit card types 310 in a variety of ways using one of various card identifying monikers 312. For example, four of the seven illustrated credit card types 310 may be referenced with the expression "Aeroplan Visa". Three of the seven illustrated credit card types 310 may be referenced with the expression "Travel Visa". Two of the seven illustrated credit card types 310 may be referenced with the expression "Business Visa".

Depending on whether a bank user may be associated with one or more credit card accounts, a natural language input provided by the bank user may be unambiguous, ambiguous, or erroneous. To illustrate, reference is made to FIG. 4, which diagrammatically illustrates example bank users associated with respective credit card account lists 400.

In an example, Alice may only have a single credit card account "TD Aeroplan Visa Infinite™ card". Accordingly, the single credit card account associated with Alice may be uniquely identified via at least one of the following natural language inputs: "my credit card, "my Visa card", "my Aeroplan Visa", "my Visa Infinite card", or the like.

Figure 4:
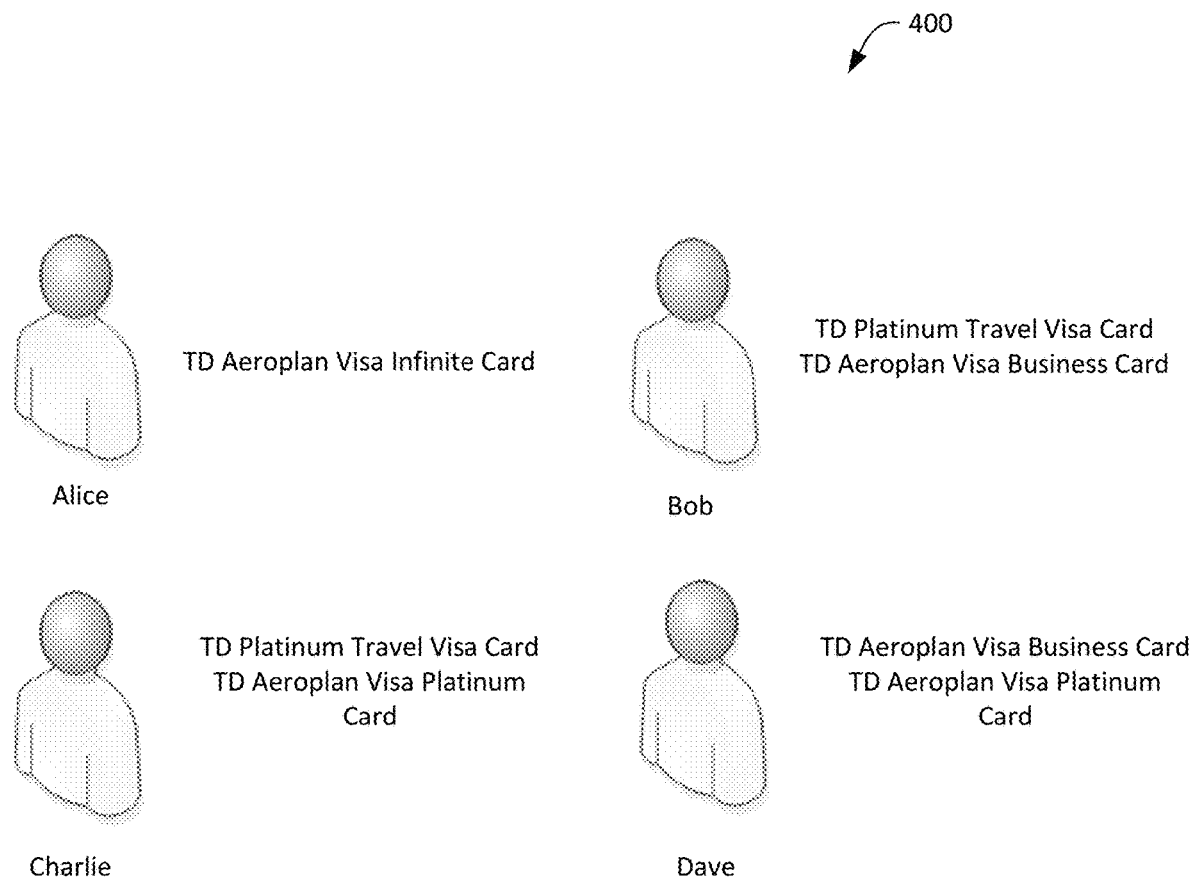
FIG. 4 diagrammatically illustrates example users associated with respective credit card account lists, in accordance with an example of the present application.

In another example, the other bank users illustrated in FIG. 4, such as Bob, Charlie, or Dave, may have more than one credit card account. When each of Bob, Charlie, or Dave provide a natural language input that references a credit card account, the input may include a moniker that may be ambiguous, unambiguous, or erroneous depending on the type or number of credit card accounts that may be associated with the respective bank user. As an example, a natural language input including the expression "my aeroplan visa" may be unambiguous for Bob and Charlie, but may be ambiguous for Dave. In another example, a natural language input including the expression "my travel visa" may be erroneous for Dave, as Dave may not have a "Travel" card. However, a natural language input including the expression "my travel visa" may be unambiguous when received from Bob or Charlie.

In another example, a natural language input including the expression "my business card" may be unambiguous to identify a single credit card account for Bob or Dave. However, a natural language input including the expression "my business card" received from Alice or Charlie may be erroneous, as Alice or Charlie may not have a "business" credit card account in the present example.

In some scenarios, the operations in the signal diagram 200 of FIG. 2 may be iterated to address detected ambiguous input. As an illustrative example, a bank user named "Fred" may have three credit card accounts: (i) TD Aeroplan Visa Business™ Card; (ii) TD Aeroplan Visa Platinum™ Card; and (iii) TD First Class Visa Infinite Travel™ Card. Referring again to the example operations illustrated in FIG. 2, the client device 110, at operation 202, may receive natural language input from Fred. The received input may be acoustic input that includes an expression to identify a credit card, such as an "Aeroplan credit card" (e.g., a partial moniker).

The client device 110 may transmit the natural language input to the conversation agent server 120 to conduct intent recognition and parameterization (operation 206) and, subsequently, receive the user intent and at least one parameter (operation 208) based on the natural language input.

The client device 110 may, at operation 210, generate a fulfillment query requesting access to a client data record associated with Fred to determine whether the natural language input includes a moniker that unambiguously identifies a credit card account. In the present example, the client device 110 may request access to Fred's client data record to determine whether the expression "Aeroplan credit card" identifies one or more credit card accounts.

At operation 220, the client device 110 transmits the fulfillment query to the fulfillment server 130 and the fulfillment server 130, at operation 222, may conduct operations to determine whether the expression "Aeroplan credit card" identifies a single credit card account. In the scenario where the expression "Aeroplan credit card" identifies a single credit card account, the fulfillment server 130 may conduct an operation to take action corresponding to the natural language input. For instance, the natural language input may have included the expression: "Please auto-pay my Aeroplan credit card from my savings bank account".

In Fred's example scenario, the expression "Aeroplan credit card" may not identify a single credit card account. Fred is associated with both a "TD Aeroplan Visa Business™ Card" and a "TD Aeroplan Visa Platinum™ card". The fulfillment server 130, at operation 222, may generate a response indication providing a result indicating that the natural language input is ambiguous and the fulfillment server 130, at operation 224, transmits to the client device 110 a response indication associated with the prior fulfillment query. In some examples, the response indication may include a listing of the credit card accounts associated with Fred's client data record. In some other examples, the response indication may simply indicate that ambiguity exists based on the natural language input and that further information for identifying is required.

The client device 110 may, at operation 230, generate a request for subsequent input based on the response indication. For example, the client device 110 may generate a clarifying message, such as "Did you mean your personal or business Aeroplan card?" or "Did you mean your Platinum card?" In some examples, the generated request for subsequent input may include a message prompt for display by the client device 110. In some other examples, the generated request for subsequent input may include an acoustic output played back by the client device 110 to Fred the bank user.

In the example where the conversation agent server 120 may be relied upon to conduct intent recognition and parameterization of natural language input, the client device 110 may generate an updated conversation context (operation 232) and transmit the updated conversation context to the conversation agent server 120 (operation 234). The conversation agent server 120 may, at operation 240, update the conversation context associated with Fred's natural language input.

Subsequently, the client device 110 may iterate one or more of the operations in the signal diagram 200 of FIG. 2 for receiving natural language input (e.g., operation 202) or generating a subsequent fulfillment query requesting access to personal data associated with Fred (e.g., operation 210) or conducting other example operations to iteratively determine whether a single credit card account may be unambiguously identified. In the present illustrating example, in response to the request for subsequent input (e.g., "Did you mean your personal or business Aeroplan card?"), if the client device 110 received additional input with the expression "business Aeroplan card", the client device 110 may conduct further operations illustrated in FIG. 2 to determine that Fred is referring to the "TD Aeroplan Visa Business™ Card". It may be appreciated that where two or more further requests for subsequent input may be required, at each respective iteration, the client device 110 may generate an updated conversation context (e.g., operation 232) for transmission to the conversation agent server 120 (e.g., operation 234) such that the respective subsequent natural language input may be recognized and parameterized with greater efficiency or accuracy or context.

In a scenario where Fred provides natural language input including at least one of the expressions "my business card", "travel card", "platinum credit card", the client device 110 may receive a response indication from the fulfillment server 130 (e.g., operation 224) indicating that a single credit card account associated with Fred may be identified.

Further, in the scenario that Fred provides input including the expression "platinum travel card", the client device 110 may receive a response indication from the fulfillment server 130 indicating that the input is erroneous, as none of the individual credit card accounts may be referenced with a moniker having the combination of the terms "platinum" and "travel".

In some examples, the fulfillment server 130 may include an application for identifying an intended record among a plurality of defined records. The respective defined records may, in the above described example, be associated with credit card accounts. Each of the defined records may be associated with a respective moniker. For instance, the expression "TD Aeroplan Visa Business Card" may be an example moniker. The fulfillment server 130 may receive, from the client device 110, a fulfillment query associated with a user identifier. In the example above, a user identifier may be associated with Fred. The fulfillment query may include a partial moniker associated with the intended record. For example, a partial moniker may be "Aeroplan credit card". The fulfillment server 130 may obtain defined records (e.g., client data records) associated with the user identifier. The fulfillment server 130 may determine that the partial moniker is associated with at least two defined records associated with the user identifier and generate and transmit, to the client device 110, a clarifying query to identify the intended record. For instance, the clarifying query may include an expression: "Did you mean your personal or business Aeroplan card?". The fulfillment server 130 may receive, from the client device 110, subsequent input associated with the clarifying query. For instance, the subsequent input may include the term "business". The fulfillment server 130 may determine that the identified record is identifiable based on the subsequent input and the partial moniker and conduct a transaction based on the identified record. In the present example, the identified record may be a data record associated with Fred's "TD Aeroplan Visa Business™ Card".

Figure 5:
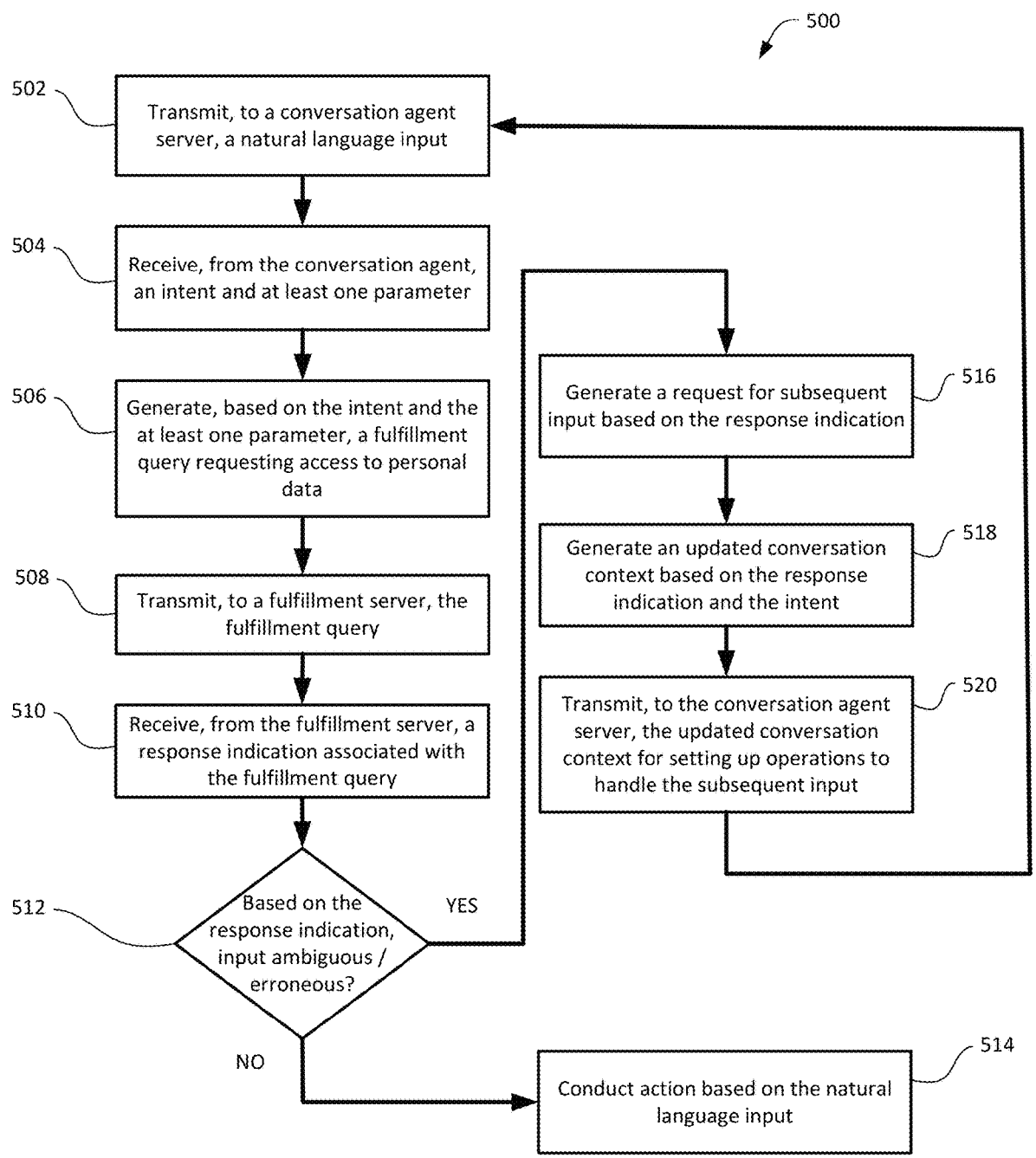
FIG. 5 illustrates, in flowchart form, a method of generating responses associated with natural language input, in accordance with an example of the present application.

Reference is made to FIG. 5, which illustrates, in flowchart form, a method 500 of generating a response associated with a natural language input, in accordance with an example of the present application. The method 500 includes operations that may be carried out by one or more processors of the client device 110 (FIG. 1). For example, the method 500 may be implemented, at least in part, through processor executable instructions associated with the interactive application 112 (FIG. 1). In some examples, one or more operations may be implemented via processor executable instructions in other applications or in an operating system stored and executed on the client device 110.

Another example of natural language input will be described to illustrate aspects of the method 500. The client device 110 may be associated with a bank customer user and the interactive application 112 (FIG. 1) may be a mobile banking application configured to interact with the fulfillment server 130 (FIG. 1). The fulfillment server 130 may be a banking institution server. The interactive application 112 may include an input interface for receiving user input. The input interface may be a microphone for receiving acoustic input or a touchscreen display for receiving textual input. Other examples of input interfaces are contemplated.

In some examples, the client device 110 may authenticate the bank customer user by requesting that authorization details be provided to the interactive application 112. For example, the authorization details may include a client number, an account number, a password, or the like.

The bank customer user may provide an acoustic input (e.g., spoken words) or alphanumeric input (e.g., typed words) and the client device 110 may receive the input "Am I eligible to pay down my principal on Friday for my mortgage? If so, please do so."

At operation 502, the processor transmits, to the conversation agent server 120, the natural language input: "Am I eligible to pay down my principal on Friday for my mortgage? If so, please do so." The example natural language input may be syntax agnostic. That is, another user wishing to provide a substantially similar query may provide an alternate natural language input in another way: "Can I make a mortgage pre-payment at the end of the week?"

In some examples, the natural language input may be associated with a user identifier. That is, the processor may associate a user identifier of the bank customer user with the received natural language input. In the present example, the natural language input may be a query on personal data of a data record corresponding to the user identifier. That is, the input "Am I eligible to pay down my principal on Friday for my mortgage?" may be a query by the bank customer user of a mortgage account associated with that user.

In some examples where the natural language input is acoustic or speech-based input, the processor may execute operations to conduct speech-to-text operations to provide a text-based natural language input. It may be appreciated that speech-to-text operations may be conducted at any one of or a combination of the client device 110 or the conversation agent server 120.

At operation 504, the processor receives, from the conversation agent server 120, an intent and at least one parameter. The intent and the at least one parameter may be based on the natural language input. In the present example, the received intent may be "mortgage pre-payment request". Further, the received at least one parameter may include: "date=Friday", "account=mortgage account", "action=payment", or the like.

At operation 506, the processor generates, based on the intent and the at least one parameter, a fulfillment query requesting access to personal data. Personal data may include names, addresses, taxpayer identification numbers, bank account numbers, account balances, or the like. In the example method 500, the client device 110 is tasked with conducting operations for querying the fulfillment server 130 or determining whether ambiguity or erroneous input has been received based on response data or a response indication from the fulfillment server 130. As the conversation agent server 120 may be operated by a third party vendor who may not be bound by confidentiality or privacy rules, operations illustrated in FIG. 5 that may be associated with personal data may not be exposed to an unscrupulous entity who may have access to the conversation agent server 120.

In the present example, the fulfillment query may include queries for determining whether the identified user is associated with an outstanding mortgage, for determining what the outstanding mortgage principal amount is, for determining whether the identified user is eligible to make a mortgage pre-payment on the outstanding principal amount, or other similar queries.

In some examples, the generated fulfillment query may be for corroborating the at least one parameter. For instance, the processor, at operation 504, received based on the natural language input a parameter that the "account=mortgage".

Accordingly, the generated fulfillment query may be to corroborate that the bank customer user is associated with an outstanding mortgage account.

At operation 508, the processor transmits the fulfillment query to the fulfillment server 130. The fulfillment query may include one or a combination of multiple queries associated with a client data record associated with the user identifier.

At operation 510, the processor receives, from the fulfillment server 130, a response indication associated with the fulfillment query. For example, the response indication may include a confirmation that the bank customer user is associated with an outstanding mortgage account, that the bank customer user is eligible to make a pre-payment as of January 1 of the present year, that the maximum prepayment amount without excess fees is $20,000, or other response information.

In the present example, the response indication may include personal data associated with a user identifier of the bank customer user. For example, the confirmation that the bank customer user is associated with an outstanding mortgage account may be personal data. Further, the data indicating that the maximum prepayment amount without excess fees may also be personal data.

At operation 512, the processor may determine, based on the received response indication, whether the prior received natural language input may be ambiguous or erroneous. In a scenario where the bank customer user is not associated with a mortgage account, the processor may determine that the received natural language input is erroneous, as the user is not associated with an outstanding mortgage balance.

In the present example, the response indication, from operation 510, may provide confirmation that the bank customer user is associated with a mortgage account and may provide confirmation that a pre-payment is allowable. However, the prior received natural language input may not have provided information on how much pre-payment the bank customer user would like to make and on which day the bank customer user desires to make the pre-payment. Thus, the processor, at operation 512, may determine that the prior received natural language input may be ambiguous and requires subsequent input.

At operation 516, the processor generates a request for subsequent input based on the response indication. Continuing with the present example, the processor can generate a request for subsequent input including a query regarding how much pre-payment the bank customer user would like to pay towards the mortgage principal or on what day the bank customer user desires to make the pre-payment (e.g., what day funds are anticipated to be available for making the mortgage pre-payment).

In some examples, the generated request for subsequent input includes a message prompt for display by the client device 110. In some other examples, the generated request for subsequent input includes an acoustic output prompt for playback by the client device 110, such that the user interacts with the client device 110 by speaking into a microphone and by receiving responses via playback acoustics on a loudspeaker of the client device 110.

At operation 518, the processor generates an updated conversation context based on the response indication and the intent. The updated conversation context may be transmitted to the conversation agent server 120 for placing the conversation agent server 120 in a state corresponding to a conversation context that the conversation agent server 120 would have been in if the conversation agent server 120 had detected the ambiguous condition itself or determined that more information is required.

In the present example, the updated conversation context may place the conversation agent server 120 in a state for receiving an input indicating an amount to pay towards the outstanding mortgage principal or for receiving a date on which the bank customer user desires to make the pre-payment. In some examples, natural language input phrases may conceivably be matched to multiple intents. Thus, providing the conversation agent server 120 with the updated conversation context equips the conversation agent server 120 with background information for conducting intent recognition or parameterization when subsequent input is received from the bank customer user. To illustrate, in the case where the subsequent input may be "ten thousand dollars on Thursday of this week", the conversation agent server 120 may conduct intent recognition and parameterization based on the prior natural language input. That is, the conversation agent server 120 may recognize that the amount of $10,000 is associated with a desired mortgage pre-payment.

At operation 520, the processor transmits, to the conversation agent server 120, the updated conversation context for setting up operations to handle the subsequent input. Subsequent to transmitting, to the conversation agent server 120, the updated conversation context for setting up operations to handle subsequent input, the processor may receive subsequent input and transmit the subsequent input to the conversation agent server 120. That is, subsequent to operation 520, the processor may conduct one or more operations corresponding to operations 502 and other operations of the method 500 of FIG. 5.

In some examples, the subsequent input may be received in a different format than the prior received natural language input. For instance, if the prior received natural language input was acoustic input, the subsequent input may be text-based input received via a touchscreen of the client device 110. In some examples, the subsequent input may be natural language input or structured input. In some scenarios, the subsequent input may be structured input, as the subsequent input may be targeted and specific as compared to an initial natural language input.

Referring again to operation 512, the processor may determine, based on the received response indication, whether the prior received natural language input may be ambiguous or erroneous. In the scenario where the processor determines that the prior received natural language input may not be ambiguous and may not be erroneous, the processor, at operation 514, may conduct an action based on the natural language input.

As an illustrating example, in a scenario where the natural language input states: "Please make a mortgage pre-payment on June 25 in the amount of ten thousand dollars from my savings account to my mortgage account number ending in 879", the processor, at operation 512, may determine based on the response indication that the natural language input is not ambiguous and not erroneous. Further, the processor, at operation 512, may determine that further clarification is not required and that a "mortgage pre-payment" action can be made based on the user provided information. That is, once the processor determines that the received at least one parameter (e.g., mortgage account number ending 879, $10,000, June 25, etc.) includes information to conduct an action associated with the intent (e.g., intent=mortgage pre-payment request), the processor may at operation 514 transmit, to the fulfillment server 130, an action request associated with the natural language input. At operation 512, the processor may determine that a requisite set of parameters are available to generate and transmit an action request.

Figure 6:
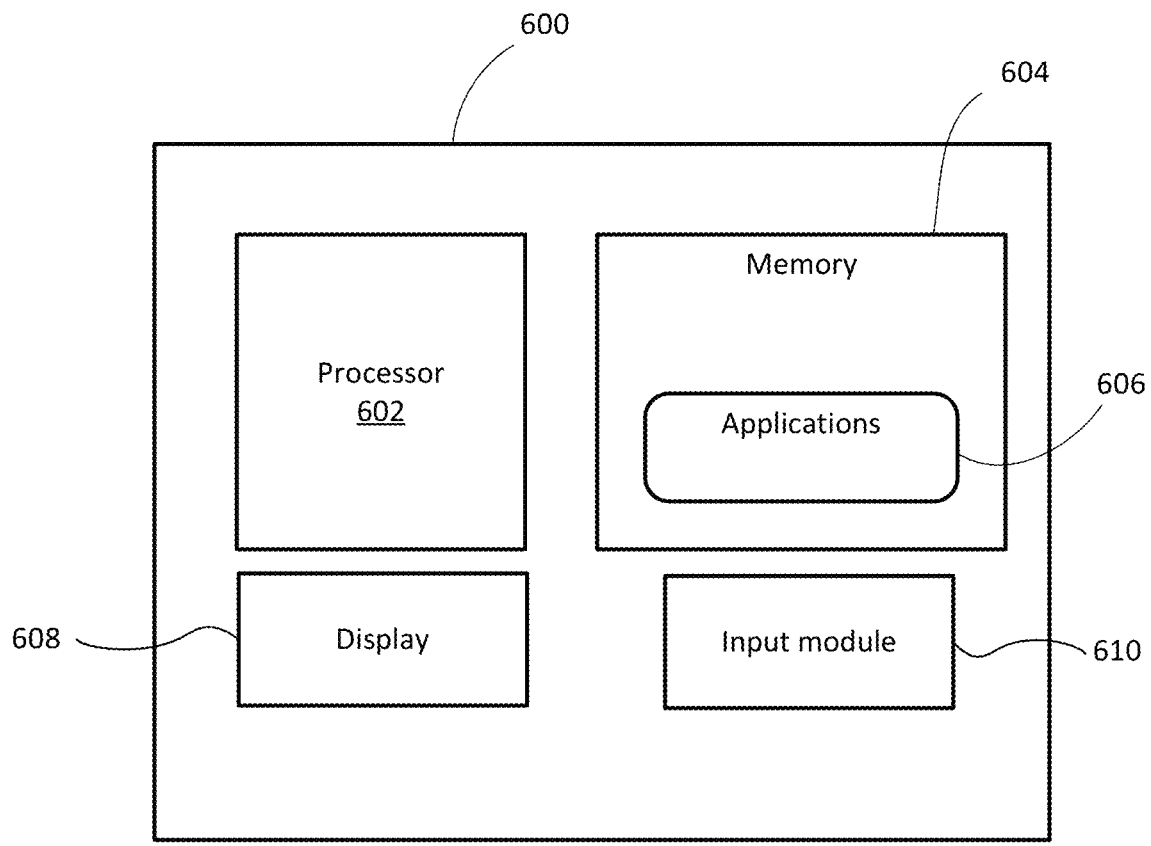
FIG. 6 illustrates, in simplified block diagram form, an electronic device, in accordance with an example of the present application.

Reference is made to FIG. 6, which illustrates, in simplified block diagram form, an electronic device 600, in accordance with an example of the present application. The electronic device 600 can be the client device 110 of FIG. 1. The electronic device 600 includes one or more processors 602, memory 604, and a communications module for providing network capabilities to communicate with other computing devices. The memory 604 may store processor executable software applications 606 that include an operating system to provide basic device operations. The software applications 606 may also include instructions implementing operations of the methods described herein.

The electronic device 600 includes a display interface and/or a display 608. The display 608 can be any suitable display such as a liquid crystal display (LCD), an e-ink/e-paper display, or the like. In some examples, the display 608 is a touchscreen display. The electronic device 600 includes an input module 610 for receiving signals representing commands described in examples herein. In some examples, the input module 610 may be a keyboard device, a touch input device, or a microphone for receiving natural language input from a user of the electronic device 600. In some examples, the electronic device 600 is a portable electronic device, such as a smartphone, a personal computer, a personal digital assistant, a portable navigation device, a mobile phone, a wearable computing device (e.g., smart watch, wearable activity monitor, or the like), or any other type of computing device that may be configured to store data and software instructions, and execute software instructions to perform example operations described herein.

Figure 7:
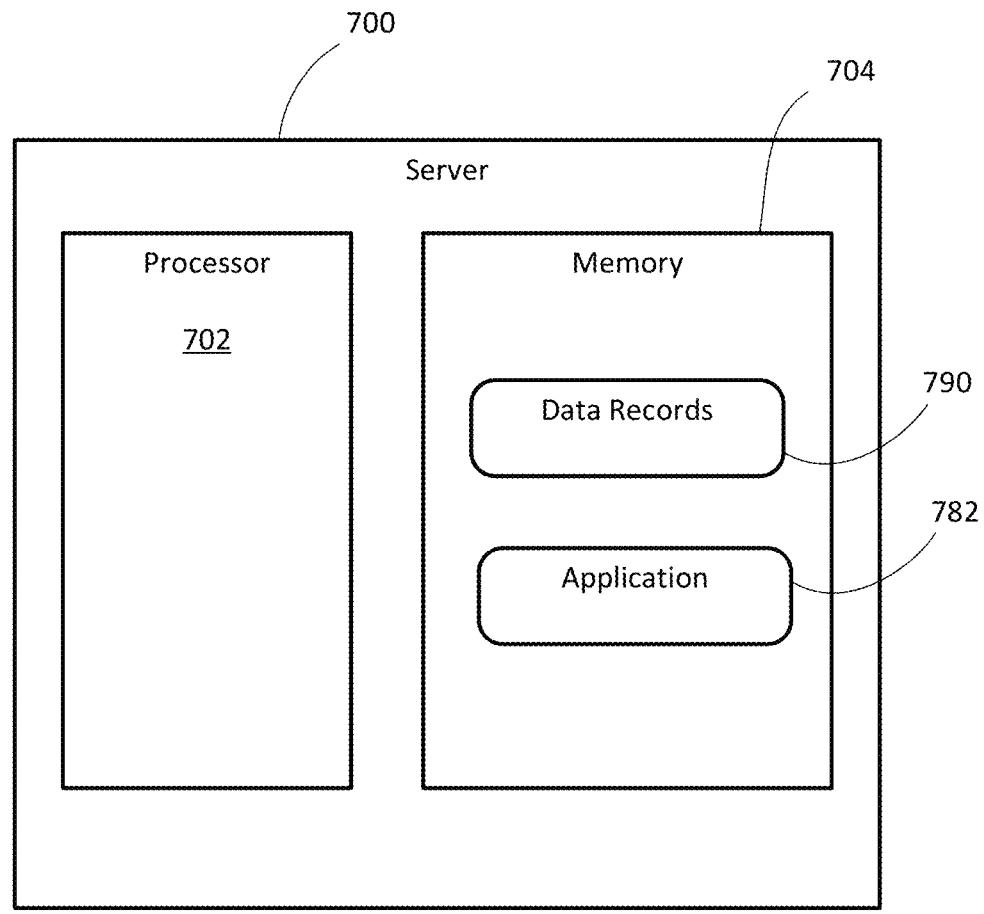
FIG. 7 illustrates, in simplified block diagram form, a server, in accordance with an example of the present application.

Reference is made to FIG. 7, which illustrates, in simplified block diagram form, a server 700, in accordance with an example of the present application. The server 700 may be the conversation agent server 120 of FIG. 1 or the fulfillment server 130 of FIG. 1. The server 700 includes one or more processors 702, memory 704, and a communications module for providing network capabilities to communicate with other computing devices. The memory 704 may include data records 790. In the example of the conversation agent server 120, the data records 790 may include the intent data 124 of FIG. 1. In the example of the fulfillment server 130, the data records 790 may be the client data records 140 or the resource records 136 of FIG. 1.

The memory 704 may also include applications 782 having instructions for performing operations described herein. In an example of the conversation agent server 120, the applications 782 may include the natural language application 122 of FIG. 1. In an example of the fulfillment server 130, the applications 782 may include the fulfillment application 132 of FIG. 1.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computing device comprising:
   a communication module;
   a processor coupled to the communication module; and
   a memory coupled to the processor, the memory storing instructions that, when executed, configure the processor to:
   transmit, to a conversation agent server, a natural language input;
   receive, from the conversation agent server, an intent and at least one parameter, wherein the intent and the at least one parameter are based on the natural language input, and wherein identification by the conversation agent server of the intent from the natural language input is syntax agnostic;
   generate, based on the intent and the at least one parameter, a fulfillment query requesting access to personal data for generating a response to the natural language input, wherein the personal data is stored on a fulfillment server;
   transmit, to the fulfillment server, the fulfillment query;
   receive, from the fulfillment server, a response indication associated with the fulfillment query;
   generate a request for subsequent input based on the response indication;
   generate an updated conversation context based on the response indication and the intent; and
   transmit, to the conversation agent server, the updated conversation context for setting up operations to handle the subsequent input.

2. The computing device of claim 1, wherein the natural language input is associated with a user identifier, and wherein the natural language input includes a query on personal data of a data record corresponding to the user identifier.

3. The computing device of claim 2, wherein the response indication includes the personal data associated with the user identifier.

4. The computing device of claim 1, wherein the generated fulfillment query corroborates the at least one parameter.

5. The computing device of claim 1, wherein the instructions, when executed, further cause the processor to:
   determine that the received at least one parameter includes information to conduct an action associated with the intent; and
   transmit, to the fulfillment server, an action request associated with the natural language input.

6. The computing device of claim 1, wherein the generated request for subsequent input includes a message prompt for display by the computing device.

7. The computing device of claim 1, wherein the natural language input includes an acoustic input, and wherein the instructions, when executed, further cause the processor to conduct speech-to-text operations to provide a text-based natural language input.

8. The computing device of claim 1, wherein the natural language input includes text-based input received via an input module of the computing device.

9. The computing device of claim 1, wherein the instructions, when executed, further configure the processor to:
receive the subsequent input; and
subsequent to transmitting, to the conversation agent server, the updated conversation context for setting up operations to handle the subsequent input, transmit the subsequent input to the conversation agent server.

10. The computing device of claim 1, wherein the subsequent input includes natural language input.

11. A computer-implemented method of generating a response associated with a natural language input, the method comprising:
transmitting, to a conversation agent server, the natural language input;
receiving, from the conversation agent server, an intent and at least one parameter, wherein the intent and the at least one parameter are based on the natural language input, and wherein identification by the conversation agent server of the intent from the natural language input is syntax agnostic;
generating, based on the intent and the at least one parameter, a fulfillment query requesting access to personal data for generating a response to the natural language input, wherein the personal data is stored on a fulfillment server;
transmitting, to the fulfillment server, the fulfillment query;
receiving, from the fulfillment server, a response indication associated with the fulfillment query;
generating a request for subsequent input based on the response indication;
generating an updated conversation context based on the response indication and the intent; and
transmitting, to the conversation agent server, the updated conversation context for setting up operations to handle the subsequent input.

12. The method of claim 11, wherein the natural language input is associated with a user identifier, and wherein the natural language input includes a query on personal data of a data record corresponding to the user identifier.

13. The method of claim 12, wherein the response indication includes the personal data associated with the user identifier.

14. The method of claim 11, wherein the generated fulfillment query corroborates the at least one parameter.

15. The method of claim 11, further comprising:
determining that the received at least one parameter includes information to conduct an action associated with the intent; and
transmitting, to the fulfillment server, an action request associated with the natural language input.

16. The method of claim 11, wherein the generated request for subsequent input includes a message prompt for display by a computing device.

17. The method of claim 11, wherein the natural language input includes an acoustic input, and wherein the method further comprises conducting speech-to-text operations to provide a text-based natural language input.

18. The method of claim 11, wherein the natural language input includes text-based input received via an input module of a computing device.

19. The method of claim 11, further comprising:
receiving the subsequent input; and
subsequent to transmitting, to the conversation agent server, the updated conversation context for setting up operations to handle the subsequent input, transmitting the subsequent input to the conversation agent server.

20. A non-transitory computer-readable storage medium storing instructions of generating a response associated with a natural language input, the instructions, when executed by a processor of a computing device, cause the computing device to:
transmit, to a conversation agent server, the natural language input;
receive, from the conversation agent server, an intent and at least one parameter, wherein the intent and the at least one parameter are based on the natural language input, and wherein identification by the conversation agent server of the intent from the natural language input is syntax agnostic;
generate, based on the intent and the at least one parameter, a fulfillment query requesting access to personal data for generating a response to the natural language input, wherein the personal data is stored on a fulfillment server;
transmit, to the fulfillment server, the fulfillment query;
receive, from the fulfillment server, a response indication associated with the fulfillment query;
generate a request for subsequent input based on the response indication;
generate an updated conversation context based on the response indication and the intent; and
transmit, to the conversation agent server, the updated conversation context for setting up operations to handle the subsequent input.

\* \* \* \* \*